US009630566B2

(12) United States Patent
Harshman

(10) Patent No.: US 9,630,566 B2
(45) Date of Patent: Apr. 25, 2017

(54) SEAT BELT VASE CARRIER

(71) Applicant: Syndicate Sales Incorporated, Kokomo, IN (US)

(72) Inventor: Trent A. Harshman, Galveston, IN (US)

(73) Assignee: Syndicate Sales, Inc., Kokomo, IN (US)

( * ) Notice: Subject to any disclaimer, the term of this patent is extended or adjusted under 35 U.S.C. 154(b) by 98 days.

(21) Appl. No.: 14/809,556

(22) Filed: Jul. 27, 2015

(65) Prior Publication Data

US 2017/0028933 A1 Feb. 2, 2017

(51) Int. Cl.
*B60R 11/00* (2006.01)

(52) U.S. Cl.
CPC ......... *B60R 11/00* (2013.01); *B60R 2011/005* (2013.01); *B60R 2011/0012* (2013.01); *B60R 2011/0031* (2013.01)

(58) Field of Classification Search
CPC .... B60R 7/043; B60R 2011/0012–2011/0017; B60R 2011/0031
USPC ........................................................ 224/275
See application file for complete search history.

(56) References Cited

U.S. PATENT DOCUMENTS

| 2,664,670 | A |   | 1/1954  | Mulford    |            |
|-----------|---|---|---------|------------|------------|
| 2,767,831 | A | * | 10/1956 | Brecht     | B65D 5/0005 |
|           |   |   |         |            | 206/423    |
| 2,809,745 | A |   | 10/1957 | Bramming   |            |
| 2,822,968 | A | * | 2/1958  | Jackson    | B60P 3/025 |
|           |   |   |         |            | 224/275    |
| 3,154,209 | A | * | 10/1964 | Wilhite    | B65D 85/20 |
|           |   |   |         |            | 211/74     |
| 3,191,791 | A | * | 6/1965  | Jackson    | B65D 81/022 |
|           |   |   |         |            | 206/445    |
| 3,289,829 | A |   | 12/1966 | Donahue    |            |
| 3,521,741 | A | * | 7/1970  | Beaudry    | B65D 5/10  |
|           |   |   |         |            | 206/423    |
| 4,067,442 | A |   | 1/1978  | Howe       |            |
| 4,754,880 | A | * | 7/1988  | Tehrani    | B65D 81/113 |
|           |   |   |         |            | 206/523    |
| 5,005,694 | A | * | 4/1991  | Davis      | F42B 39/30 |
|           |   |   |         |            | 102/275.1  |
| 5,029,708 | A | * | 7/1991  | Alonso     | B65D 85/52 |
|           |   |   |         |            | 206/423    |
| 5,156,277 | A | * | 10/1992 | Witz       | B29C 51/26 |
|           |   |   |         |            | 206/524.1  |
| 5,743,393 | A |   | 4/1998  | Webb et al.|            |
| 6,102,204 | A | * | 8/2000  | Castleberry| B65D 5/503 |
|           |   |   |         |            | 206/423    |

(Continued)

OTHER PUBLICATIONS

How to Properly Adjust the Drivers Seat, http://ergonomics.about.com/od/car/ss/adjusting_drivers_seat_3.htm—Jun. 15, 2015.

*Primary Examiner* — Brian D Nash
(74) *Attorney, Agent, or Firm* — Woodard, Emhardt, Moriarty, McNett & Henry LLP

(57) ABSTRACT

A carrier mountable to a vehicle seat for holding objects, such as a vase with flowers. A one piece foldable structure has holes for receiving the vase at two separate locations along the vase length with the carrier back wall being positioned toward and against the inclined seat back. A seat belt extends across the front wall of the carrier through recesses securely holding the seat belt thereto.

16 Claims, 3 Drawing Sheets

(56) References Cited

U.S. PATENT DOCUMENTS

| | | | | |
|---|---|---|---|---|
| 6,561,353 B2* | 5/2003 | Levieux | ............ | A47G 7/025 |
| | | | | 206/423 |
| 6,796,469 B2* | 9/2004 | Lofaro | ............ | B60R 7/043 |
| | | | | 224/275 |
| 6,880,703 B2* | 4/2005 | Pena | ............ | B65D 85/505 |
| | | | | 205/443 |
| 7,637,404 B1* | 12/2009 | Stepanova | ............ | B60R 7/043 |
| | | | | 224/275 |
| 7,966,949 B2* | 6/2011 | Willey | ............ | B60N 3/002 |
| | | | | 108/25 |
| 8,479,917 B1 | 7/2013 | Harshman | | |
| 2002/0189963 A1 | 12/2002 | Weder et al. | | |
| 2003/0024851 A1* | 2/2003 | Auclair | ............ | B65D 5/504 |
| | | | | 206/756 |

* cited by examiner

SEAT BELT VASE CARRIER

BACKGROUND OF THE INVENTION

Field of the Invention

The present invention relates generally to the field of containers for holding objects within a vehicle. More specifically, a carrier for vases is disclosed securable on a vehicle seat by a seat belt.

Description of the Prior Art

In my U.S. Pat. No. 8,479,917, I disclosed a carrier or packaging container for holding flower stems inserted within a vase while being transported to the recipient. The carrier is inexpensive and easily assembled for holding a vase in place while allowing the flower stems to be placed at least partially inside the vase thereby protecting the vase and flowers as they are transported. The prior typical method of delivering flowers is to wrap the flowers within tissue paper or hold the vase separately with bubble wrap or a foam type construction.

A further need for delivering vases with flowers is for an improved means for holding the carrier in a secure manner during vehicle movements. In the event the carrier is not securely held, then it is possible the carrier may tip over thereby damaging or even ruining the flowers and/or vase. Disclosed herein is an inexpensive and easily assembled carrier designed to snugly rest against the inclined vehicle seat back while secured thereto by means of a seat belt extending across the front of the carrier. Another approach is to hold the vase with flowers within a box having a top wall with a hole through which the vase extends, such as, disclosed in U.S. Pat. No. 6,561,353. The top wall of the box includes perforations forming tabs that will move to grip the vase accommodating vases of outside diameters. The box has a rear panel extendable into the bight between the seat bottom and inclined seat back to hold the carrier to the seat.

SUMMARY OF THE INVENTION

One embodiment of the present invention is a shipping carrier for removably holding a vase securely to a vehicle seat having an inclined seat back and a seat belt extendable over and against the carrier. A one-piece main body has a first end and an opposite second end. The main body is folded forming a top wall and an exterior bottom wall with a front wall and rear wall being spaced apart and extending between the top wall and the bottom wall. The main body further has an angular extending locking wall located interiorly in the carrier extending diagonally from the top end of the rear wall and the top wall to a location adjacent the bottom wall and the front wall. The top wall has a first hole through which the vase is extendable. The locking wall has a second hole through which the vase is extendable. The front wall and rear wall are arranged at acute angles with the plane of the bottom wall with the first hole and the second hole locking the vase within the container.

BRIEF DESCRIPTION OF THE DRAWINGS

FIG. 3 is a side perspective view showing the interior wall 41 folded relative to the interior bottom wall 62, and the rear wall 24, in turn, folded relative to the exterior bottom wall 64.

FIG. 4 is the same view as FIG. 3 and showing the bottom wall 64 folded forming the front wall 32 with the front wall 32 being folded forming the top wall 65.

FIG. 5 is an opposite side view showing the tab on the top wall inserted through a slot located at the junction of the angular wall and rear wall hereby forming the assembled carrier prior to being attached to the inclined seat back.

DESCRIPTION OF THE PREFERRED EMBODIMENT

Figure 1:
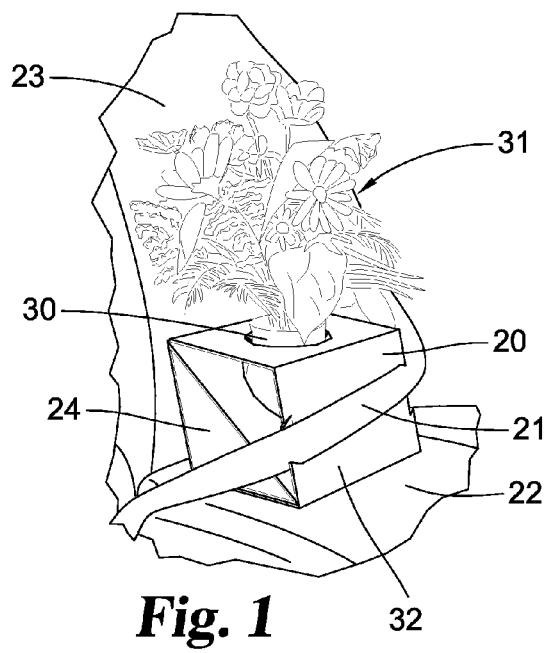
FIG. 1 is a front perspective view of the carrier incorporating the present invention having a vase and flowers mounted therein and secured by means of a seat belt.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is shown a carrier 20 for holding a vase 30 and bouquet of flowers 31 atop a vehicle seat 22. A standard seat belt 21 extends across the front wall 32 of carrier 20. The rear wall 24 of carrier 20 is held against the inclined seat back 23 of the vehicle seat by belt 21. Carrier 20 may be produced from various thin walled materials. Excellent results have been obtained by producing the main body of the carrier from corrugated paperboard enabling the main body to be folded at various locations forming the front, top, rear, bottom and interior walls.

Figure 2:
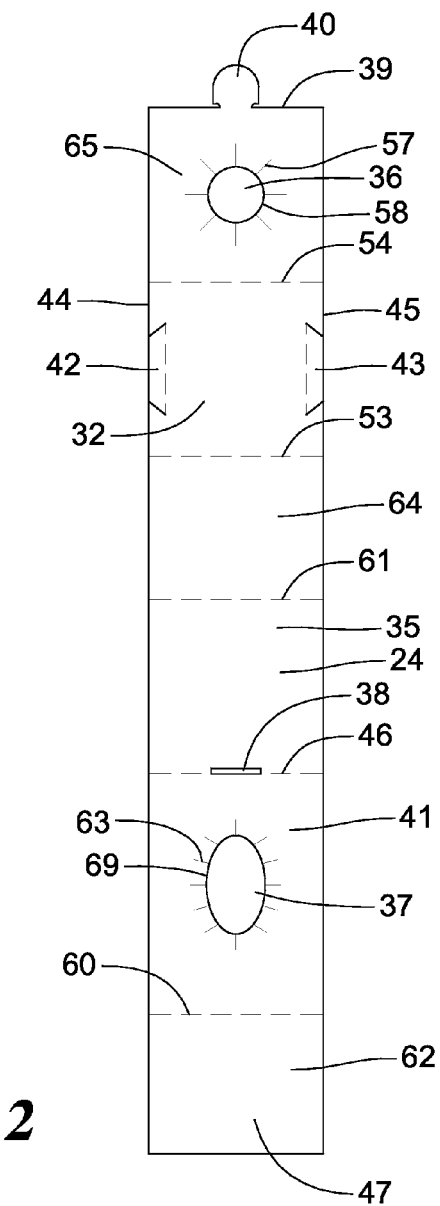
FIG. 2 is a plan view of a strip of corrugated paperboard folded in place to form the carrier of FIG. 1.

FIG. 2 shows a flat strip of corrugated paperboard which is used to form the carrier of FIG. 1. Strip 35 forms the main body of the carrier and has a pair of holes 36 and 37 located towards the opposite ends of the strip. Hole 36 is circular whereas hole 37 is generally oval shaped. End 39 which is referred to as the top end of the strip has a tab 40 formed thereon which extends outwardly from the end with the first hole 36 located near to the end 39 of the strip. A slot 38 extends partially across the width of the strip and is located near oval shaped hole 37 located near the end 47 which will be referred to as the bottom end of the strip. A pair of flaps 42 and 43 are formed respectively in the longitudinal extending edges 44 and 45 of the strip and are operable to receive and hold the seat belt to the front wall of the carrier.

Figure 3:
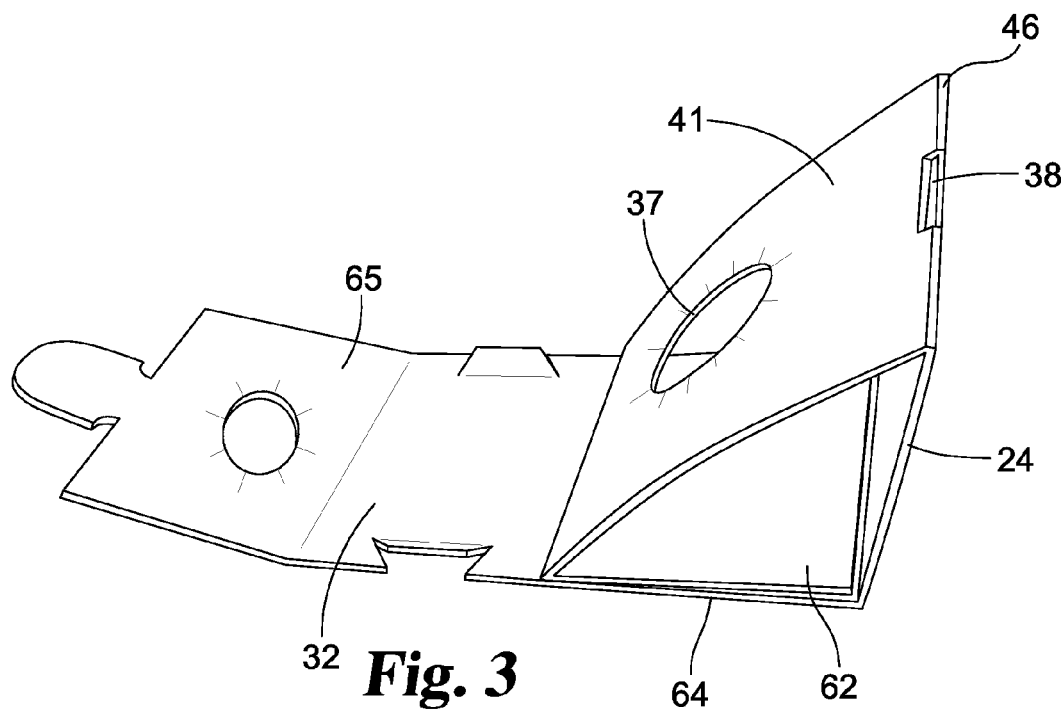
FIGS. 3-5 are perspective views showing the various steps of bending and forming the carrier.
Figure 4:
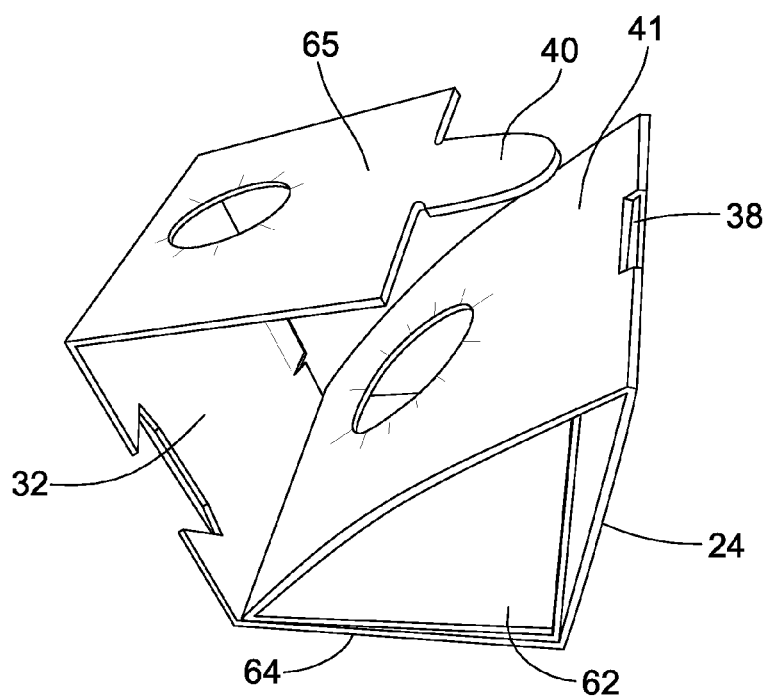
Figure 5:
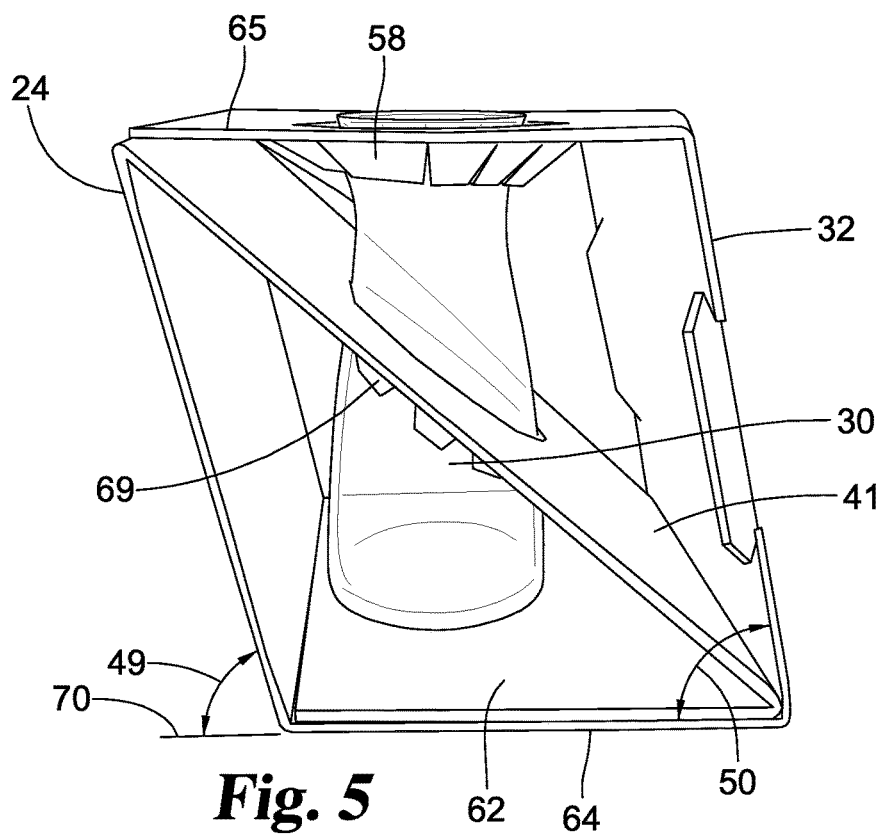

FIGS. 3-5 illustrate the steps of folding and assembling the flat strip into the final configured carrier.

Strip 35 is folded along five crease lines, namely 60, 46, 61, 53 and 54. Crease line 60 defines the integrally connected interior bottom wall 62 with the downwardly extending interior angular wall 41. Crease lines 46 and 61 define the rear wall 24 whereas crease line 61 and 53 define the exterior bottom wall 64. Crease lines 53 and 54 define the front wall 32 whereas the top wall 65 is defined by and extends between crease line 54 and top end 39.

In FIG. 3, strip 35 is folded along crease line 60 locating the interior bottom wall 62 immediately atop and adjacent the interior surface of strip 35 while simultaneously forming the upwardly extending angular wall 41 containing the oval shape opening 37. The top end of angular wall 41 is folded along crease line 46 which extends widthwise across the strip and through slot 38 with the rear wall 24 then being formed by folding the main strip downwardly along crease line 46 with the rear wall extending past the interior bottom wall 62. Rear wall 24 is then folded along crease line 61 forming the exterior bottom wall 64 located outwardly of the interior bottom wall 62. Angular wall 41 (FIG. 5) extends upwardly at an acute angle relative to the planes of bottom walls 62 and 64 to top wall 65.

Figure 6:
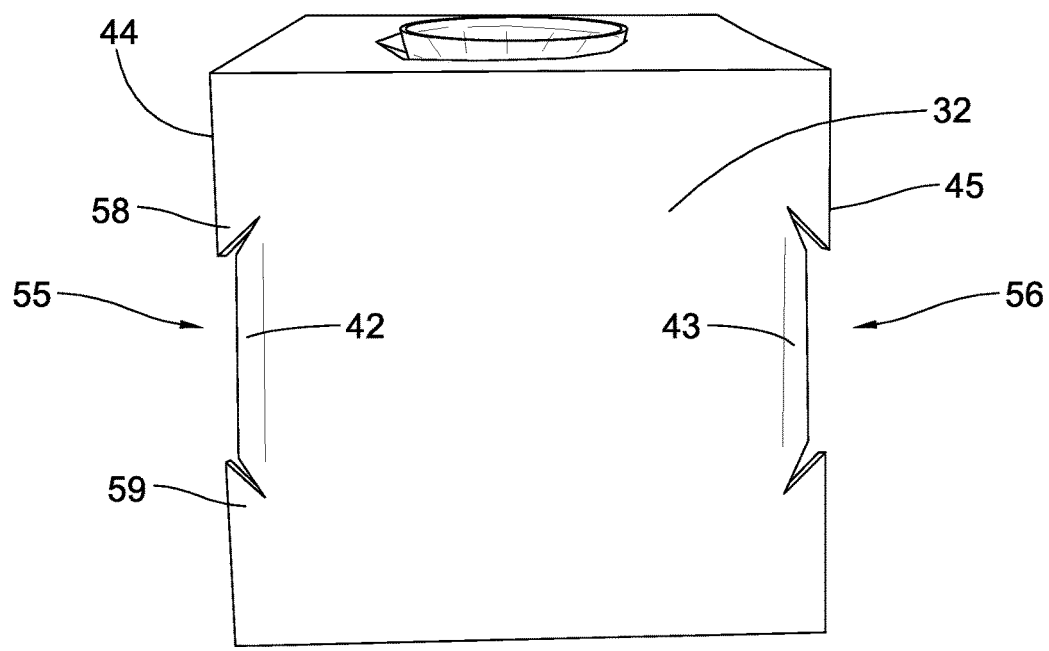
FIG. 6 is a front perspective view illustrating the seat belt notches formed in the front wall.

In FIG. 4, the exterior bottom wall 64 is folded along crease line 53 forming the upwardly extending front wall 32 having a top end folded along crease line 54 forming the top wall 65 extending across the container. Top wall 65 has a tab 40 formed at the end 39 of the strip which is then extended into the slot 38 securing the walls together. Front wall 32 includes vertically extending edges 44 and 45 (FIG. 6) with recesses 55 and 56 respectively formed therein by means of a pair of pivotable flaps 42 and 43. Each flap has a proximal end pivotally connected to front wall 32 by means of a crease or fold line with each flap moving inward towards the rear wall to allow recesses 55 and 56 (FIG. 6) to receive the seat belt 21 (FIG. 1) extending across and against the front wall. The flaps are cantileverly mounted to the front wall; however, the present invention includes complete removal of the flaps with the recesses still receiving the seat belt to limit relative motion between the seat belt and carrier. The front wall includes a pair of opposed fingers restricting the entrance into the recess limiting accidental movement of the belt from the recess. For example, front wall 32 includes extensions or fingers 58 and 59 (FIG. 6) that extend into recess 55 thereby restricting the entrance and likewise restricting movement of the belt from the recess. Similarly, recess 56 is provided with a pair of fingers restricting the entrance into the recess. The recesses provide notches for the seat belt to securely hold the carrier in place.

In order to mount the vase 30 (FIG. 5) to carrier 20, tab 40 is removed from slot 38 with the top wall 65 then being pivoted away from the rear wall and the bottom of the vase being inserted through the oval shaped hole 37 of angular wall 41. Top wall 65 is then pivoted toward the rear wall while extending the top portion of the vase through the circular hole 36 with tab 40 then being inserted into slot 38. Circular hole 36 is provided with a plurality of slots or perforations 57 (FIG. 2) which extend radially outward from the center of the hole. The slots extend through the main body 35 of the carrier thereby forming a plurality of fingers or tabs 58 which will move to accommodate the diameter of the vase extending therethrough. The fingers help lock the vase in place and adapt to multiple sized vases. Likewise, oval hole 37 is provided with a plurality of slots or perforations 63 (FIG. 2) which extend radially outward from the center of hole 37. Slots 57 and 63 extend through the main body 35 of the carrier thereby respectively forming a plurality of fingers or tabs 58 and 69 which will move to accommodate the diameter of the vase extending therethrough. In many cases, the vase will not have a uniform outside diameter from its base to its top entrance. For example, vase 30 shown in FIG. 5 has an outside diameter at is top portion that decreases and then increases along its length to a maximum outside diameter at is bottom portion. The fingers 58 and 69 therefore accommodate the different outside diameters while still gripping the vase at two separate locations along the length of the vase.

The main body of the carrier is designed to rest against the inclined seat back of the vehicle seat. Typically, seat back 23 forms an included angle of 100 degrees to 110 degrees with respect to seat bottom 22. Thus, rear wall 24 and front wall 32 are shown (FIG. 5) arranged at the acute angles 49 and 50 relative to the plane of the bottom walls 62 and 64 with the walls resting atop the seat bottom. The radially extending perforated slots 57 and 63 will adjust and allow fingers 58 and 69 to move maintaining the grip on the vase. The vase is installed atop bottom wall 62 and extends perpendicularly upward relative to bottom wall 62.

The shipping container or carrier 20 is particularly advantageous in that it is produced from a single or one piece main body having a variety of folds forming the components of the carrier. More specifically, the angular interior wall 41 is folded or pivotally formed along crease line 60 forming wall 62 which in the assembled state has an end located adjacent the rear wall 24 (FIG. 5) with the top end of wall 41 being pivotally formed along crease line 46 which is located adjacent the rear wall 24 of the carrier. In turn, the rear wall 24 is pivotally formed along crease line 61 adjacent the exterior bottom wall 64 which has a further pivotal formation along crease line 53 located adjacent the front wall 32. Last, the front wall 32 is pivotally formed along crease line 54 located adjacent the top wall 65 thereby providing the container to a slanted position when the container with vase are positioned atop the vehicle seat and against the inclined seat back. Angle 49 is formed between the outside surface of rear wall 24 and the plane 70 of bottom walls 62 and 64 whereas angle 50 is formed between the inside and rearwardly facing surface of front wall 32 and bottom walls 62 and 64. With the vase mounted in the carrier, angles 49 and 50 are acute and approximately each 70 degrees thereby locating the rear wall 24 of the carrier against the seat back 23 which is typically arranged at approximately 110 degrees relative to the seat bottom 23.

Main body 35 (FIG. 2) has a first end 39 having tab 40 formed thereon and opposite second end 47. End 39 when the carrier is assembled is located at the top of the carrier whereas end 47 is located in the interior of the carrier since bottom wall 62 rests atop exterior bottom wall 64 with end 47 being positioned adjacent the rear wall 24. Locking wall 41 extends diagonally from the bottom of the front wall 32 to the top of the rear wall 24.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A shipping carrier for removably holding a vase securely to a vehicle seat having an inclined seat back and a seat belt extendable over and against the carrier comprising:

a one-piece main body having a first end and an opposite second end, said main body being folded forming a top wall and an exterior bottom wall with a front wall and rear wall being spaced apart and extending between said top wall and said bottom wall, said rear wall has a top end, said main body further having an angular extending locking wall extending interiorly in the shipping container diagonally from said top end of said rear wall and said top wall to a location adjacent said bottom wall and said front wall, said top wall has a first hole through which the vase is extendable, said locking wall has a second hole through which the vase is extendable with said top wall and said locking wall arranged to grip the vase at two separate locations, said front wall forms an included acute angle with respect to said bottom wall and said rear wall forms an included obtuse angle relative to said bottom wall.

2. The shipping carrier of claim 1 wherein said front wall has a pair of opposite longitudinally extending edges with a pair of aligned recesses to receive a seat belt extending over and against said front wall and through said recesses to hold said main body to a vehicle seat against said inclined seat back.

3. The shipping carrier of claim 2 wherein said recesses are formed by cantilevered flaps that are pivotable away from said edges locking said seat belt within said recesses.

4. The shipping carrier of claim 3 wherein said first end of said main body is located atop the carrier whereas said opposite second end of said main body is located within the carrier atop said bottom wall.

5. The shipping carrier of claim 4 wherein said first end has a tab extendable through the top end of said rear wall holding said main body in position with said rear wall resting against the seat back of the vehicle seat upon which said carrier is held by the seat belt.

6. The shipping carrier of claim 5 wherein said top wall has radially extending slots extending outwardly from said first hole forming inwardly facing edge portions to adjustably grip the vase therebetween.

7. The shipping carrier of claim 6 wherein said first hole is circular whereas said second hole is oval shaped.

8. The shipping carrier of claim 7 wherein said opposite second end of said main body is positioned adjacent said rear wall and said bottom wall.

9. The shipping carrier of claim 2 wherein said front wall has pairs of opposed fingers restricting entrance into said recesses limiting movement of a seat belt located therein and wherein said main body extends from said locking wall to said opposite second end forming an interior bottom wall atop said exterior bottom wall with said opposite second end contactable with said rear wall.

10. The shipping carrier of claim 1 wherein said included acute angle is 70 degrees and said included obtuse angle is 110 degrees.

11. The combination of a vase and a shipping container mountable atop a vehicle seat having a vehicle inclined seat back and a seat belt for securing the container thereto comprising:
 a vase;
 a shipping container for holding said vase, said container having a main body with a top wall with a first hole through which said vase is extendable and further having an interior wall integrally connected to said top wall with a second hole through which said vase is extendable when extended through said first hole, said main body having an exterior bottom wall, a rear wall and a front wall which are integrally connected to said top wall and said interior wall forming a one-piece construction, said rear wall restable against a vehicle inclined seat back when a seat belt is extendable across and against said front wall positioning said first hole and second hole relative to each other to grip said vase at two locations along the length thereof and
wherein said main body has a bottom end located within said container and a top end forming a tab engaged with said rear wall.

12. The combination of claim 11 wherein said first hole is circular whereas said second hole is elongated with said interior wall extending at an acute angle from said bottom wall to said top wall.

13. The combination of claim 12 wherein said first hole is formed by a plurality of flaps surrounding said first hole to adjustably grip said vase extending threrethough.

14. The combination of claim 13 wherein said vase extending through said first hole and second hole with said rear wall arranged at an included obtuse angle relative to said bottom wall when positioned against said vehicle inclined seat back holding said first hole and second hole relative to each other thereby holding said vase within said container.

15. The combination of claim 14 wherein said front wall has notches to receive a seat belt extending across said front wall and through said notches holding said container atop said vehicle seat, said front wall has extensions limiting movement of said seat belt from said notches.

16. The combination of claim 15 wherein said main body is bent at the location of said interior wall adjacent said front wall, at said interior wall adjacent said rear wall, at said rear wall adjacent said bottom wall, at said bottom wall adjacent said front wall, and at said front wall adjacent said top wall allowing said container to have a fixed position when said vase is mounted therein when said container with vase therein are positioned atop the vehicle seat and against an inclined seat back.

* * * * *